United States Patent Office 2,731,380
Patented Jan. 17, 1956

2,731,380
METHOD FOR CONTROLLING GASTROPODA WITH OCTYL VINYL SULFONE

Roland S. Shumard, Brentwood, Mo., assignor to Monsanto Chemical Company, St. Louis, Mo., a corporation of Delaware No Drawing. Application December 29, 1951,
Serial No. 264,253

1 Claim. (Cl. 167—22)

This invention relates to the control of mollusks with octyl vinyl sulfone and more particularly this invention relates to the use of this chemical as a molluscacide.

The discovery of effective molluscacides is of extreme importance to mankind due to the fact that elimination of certain snails, which are a class of animal life, Gastropoda, within the phylum Mollusca, seems to be a sound approach to the prevention of schistosomiasis, which is reputedly the world's number three health problem. Schistosomiasis is caused by a trematode of the genus Schistosoma, a kind of flat, leaf-shaped worm called a fluke, which must depend upon certain snails for a part of its life cycle and another part of its life cycle must be spent within the body of a warm-blooded animal, particularly human beings, where it attacks the internal organs.

Thus these snails are a necessary intermediate host or vector for the fluke which causes schistosomiasis. The life cycle of the fluke can therefore be broken and the spread of the schistosomiasis stopped by the elimination of the snails which act as the necessary intermediate host or vector for the fluke. The elimination of the snails which make the life cycle of this fluke possible is of particular importance due to the fact that there are no known therapeutic curatives or prophylactics for use against schistosomiasis, nor are there any established sanitary control methods against the causative fluke.

There are both aquatic and amphibious snails which are vectors for the fluke causing schistosomiasis. Human beings who must bathe, drink, wade or do laundry in the waters which are the habitats of such aquatic or amphibious snails are thereby exposed to the flukes which cause schistosomiasis. On the other hand, human beings who encounter the land areas or vegetation which are within the habitats of the amphibious snail vector are also likely to contract schistosomiasis.

In combating the aquatic type of snail, it is necessary to apply the molluscacide to the waters or land areas adjacent thereto which form the habitats for such snails and therefore to be practical as a molluscacide, the toxic agent must exhibit molluscacidal activity at relatively high dilutions.

In combating the amphibious type of snail which also serves to propagate this disease, octyl vinyl sulfone may also be formulated into a dust which can be dispersed or scattered on vegetation or the ground along the banks of streams, rivers and irrigation canals or the edges of other bodies of water so that the amphibious snail will come into contact with this molluscacidal agent when it leaves the water and begins to travel across the ground areas.

Where the mollusks sought to be controlled have water habitats, octyl vinyl sulfone may be added directly to the water habitat, or a dust formulation containing this molluscacide may be cast on the surface of the water, or a liquid emulsion formulation may be added to the water.

Inert diluent powders for the formulation of such dusts may be fuller's earth, diatomaceous earth, bentonite, talc, pyrophyllite or various natural clays such as Homer's clay, China clay or Cherokee clay; botanical carriers such as soybean flour, wood flour, or walnut shell flour may also be used. Best results are obtained with such dust formulations where the particle size of the dust formulation has been reduced to 5 microns or below, and also where the inert carrier is an adsorbent powder. Effective dust formulations may be prepared containing the inert diluent powder and 15–75% by weight of octyl vinyl sulfone. Effective molluscacide control has been obtained using a dust formulation containing 50% of octyl vinyl sulfone and 50% of the inert diluent powder and applying the formulation at the rate of 50 pounds per acre per area. "Wettable" dust formulations may be prepared using 15–50% by weight of octyl vinyl sulfone, 48–83% of an inert diluent powder and 2–5% of a wetting agent of the organic sulfonate type, for example, dodecyl benzene sodium sulfonate or dioctyl sodium sulfosuccinate. Effective liquid molluscacidal formulations may also be prepared comprising octyl vinyl sulfone as the essential active ingredient using various solvents such as xylene and any one of a large number of well known emulsifying agents. Such formulations may contain, for example, 15–50% by weight of octyl vinyl sulfone, 30–80% of a solvent xylene, and 5–10% by weight of an emulsifying agent such as the organic sulfonates as have been described. The actual concentration of the octyl vinyl sulfone for any specific application will be determined upon whether the chemical is to be applied directly to the water which forms the habitat for the snails or to land areas which are crossed by amphibious snails, either as the chemical alone or in a formulation. Those skilled in the art of combating mollusks will readily establish the proper concentration for any particular application, knowing the effective dilution factor, which is generally expressed as the maximum aqueous dilution which will produce a 50% kill and a chemical is usually deemed to have satisfactory molluscacidal activity if it will produce a 50% kill at a dilution of one part in 8,000 parts of water.

It has now been discovered that octyl vinyl sulfone has an outstanding molluscacidal activity as shown by the following test data. It was found that at a dlution of one part of octyl vinyl sulfone in 15,000 parts of water, octyl vinyl sulfone produced a 50% kill of the amphibious Gastropoda.

While the octyl vinyl sulfone may be most advantageously used to combat the amphibious type of snail which are vectors for the fluke which causes schistosomiasis, this chemical is also effective for combating other species of the phylum Mollusca.

I claim:

The method for controlling Gastropoda comprising contacting Gastropoda with octyl vinyl sulfone.

References Cited in the file of this patent

UNITED STATES PATENTS 2,474,808    Schoene _____ July 5, 1949
2,634,202    Fincke _____ Apr. 7, 1953

OTHER REFERENCES

Colman: U. S. Dept. of Agriculture and Plant Quarantine, Div. of Insect Investigation Mimeograph. Publication E592, 1943, pp. 1, 2 and 6.

Frear: A Catalogue of Insecticide and Fungicides, vol. 1, p. 58, Catalogue Number 264-991-1001, and p. 19.

Weinman et al.: Jour. of Economic Entomology, vol. 40, pp. 70 to 78, 1947.

Berry et al.: Public Health Reports, vol. 65, pp. 939 to 949, July 1950.

McMullen: Journ. of Parasit., vol. 34, sec. 2 suppl., December 1948, p. 33.

Amer. Journ. of Trop. Med. and Hygiene, July 1952, pp. 671–679.